United States Patent
Endres et al.

(10) Patent No.: US 12,473,939 B2
(45) Date of Patent: Nov. 18, 2025

(54) APPARATUS AND METHOD FOR CONNECTING TWO COMPONENTS BY MEANS OF AT LEAST ONE BALL

(71) Applicant: Bayerische Motoren Werke Aktiengesellschaft, Munich (DE)

(72) Inventors: Martin Endres, Pfaffenhofen an der Ilm (DE); Franz Korber, Mallersdorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 580 days.

(21) Appl. No.: 17/915,867

(22) PCT Filed: Mar. 4, 2021

(86) PCT No.: PCT/EP2021/055433
§ 371 (c)(1),
(2) Date: Sep. 29, 2022

(87) PCT Pub. No.: WO2021/197751
PCT Pub. Date: Oct. 7, 2021

(65) Prior Publication Data
US 2023/0131941 A1   Apr. 27, 2023

(30) Foreign Application Priority Data
Mar. 31, 2020 (DE) .................. 10 2020 108 850.7

(51) Int. Cl.
*F16B 21/07*   (2006.01)
*F16B 5/06*   (2006.01)

(52) U.S. Cl.
CPC .......... *F16B 21/071* (2013.01); *F16B 5/0642* (2013.01)

(58) Field of Classification Search
CPC .............................. F16B 21/071; F16B 5/0642
See application file for complete search history.

(56) References Cited

U.S. PATENT DOCUMENTS

| 2,115,545 A | 4/1938 | Yumont |
| 4,637,116 A * | 1/1987 | Parisch .................. B60J 7/02 29/520 |

(Continued)

FOREIGN PATENT DOCUMENTS

| DE | 10 2010 041 356 A1 | 3/2012 |
| DE | 10 2011 080 483 A1 | 2/2013 |

(Continued)

OTHER PUBLICATIONS

PCT/EP2021/055433, International Search Report dated Jun. 22, 2021 (Two (2) pages).

(Continued)

*Primary Examiner* — Seahee Hong
(74) *Attorney, Agent, or Firm* — Crowell & Moring LLP

(57) ABSTRACT

An apparatus for connecting a first component to a second component by a ball which is fastened to the first component and which is fastenable in an opening of the second component includes a tool which includes two gripping elements and a retainer. The ball can be encompassed and pulled into the opening in a fastening direction by the two gripping elements. The second component is holdable in a position relative to the tool along the fastening direction by the retainer. The two gripping elements are movable relative to the retainer along the fastening direction to pull the ball into the opening until the first and second components are in contact with one another. The tool is movable in three dimensions by a robot.

15 Claims, 6 Drawing Sheets

(56) References Cited

U.S. PATENT DOCUMENTS

| | | | | |
|---|---|---|---|---|
| 9,050,690 | B2 * | 6/2015 | Hammer | F16B 5/0642 |
| 9,222,500 | B2 * | 12/2015 | Herzinger | B29C 65/72 |
| 9,597,755 | B2 * | 3/2017 | Herzinger | F16B 5/0642 |
| 9,631,655 | B2 * | 4/2017 | Van Niekerk | F16B 21/07 |
| 10,005,191 | B2 | 6/2018 | Takikawa et al. | |
| 2017/0097026 | A1 * | 4/2017 | Korber | F16B 21/065 |

FOREIGN PATENT DOCUMENTS

| | | |
|---|---|---|
| DE | 10 2016 201 211 A1 | 7/2017 |
| DE | 10 2017 107 244 A1 | 10/2017 |
| DE | 10 2016 217 796 A1 | 3/2018 |
| DE | 10 2017 213 824 A1 | 2/2019 |
| DE | 20 2019 000 040 U1 | 3/2019 |
| FR | 2 887 306 A1 | 12/2006 |
| FR | 2 918 723 A1 | 1/2009 |

OTHER PUBLICATIONS

German-language German Office Action issued in German application No. 10 2020 108 850.7 dated May 11, 2022 (Three (3) pages).

* cited by examiner

APPARATUS AND METHOD FOR CONNECTING TWO COMPONENTS BY MEANS OF AT LEAST ONE BALL

BACKGROUND AND SUMMARY OF THE INVENTION

The invention relates to an apparatus and to a method for connecting two components by means of at least one ball.

It is already generally known, in particular from series vehicle production, to reshape two components by means of a tool in order to interconnect the components. Furthermore, it is known to interconnect components by means of plug-in connections and/or screw connections, the respective connections being able to be produced by means of respective tools.

It is an object of the present invention to provide an apparatus and a method for connecting two components, by means of which the components can be interconnected in a particularly simple and quick manner.

The invention relates to an apparatus for connecting two components by means of at least one ball. The at least one ball is fastened to one of the components and can be fastened in an opening of the other component. In particular, the at least one ball is integrally bonded to the one component and can be inserted in the opening of the other component. The ball inserted in the opening can be connected to the other component by means of a frictional connection and/or an interlocking connection to a wall defining the opening of the other component. The apparatus includes a tool for connecting the components. The tool includes at least two gripping elements, by means of which the ball is to be encompassed and pulled into the opening in the fastening direction. In this case, the fastening direction can coincide with a central axis of the opening. The tool further includes a retaining means, by which the other component having the opening is to be held in the position thereof relative to the tool along the fastening direction.

Gripping elements can be moved relative to the retaining means until the two components are in contact with one another in order to pull the ball into the opening. This means that the gripping elements can be moved relative to the retaining means along the fastening direction. By means of the gripping elements, the ball is to be gripped and pulled into the opening, in particular through the opening, the other component that has the opening being retained by the retaining means so that, by means of the tool, the ball and the other component are acted upon along the fastening direction by forces working in opposite directions. By means of the gripping elements, the ball is pulled into or out of the opening at least in some regions until the two components are in contact with one another. A particularly secure connection of the components can thus be achieved by means of the at least one ball. In order to ensure that the ball is held in the opening of the other component in a particularly secure manner, the ball can be clamped by the wall defining the opening of the other component. The apparatus further includes a robot means, by which the tool can be moved in three dimensions. In other words, by the robot means, the tool can be received and moved relative to at least one of the components. By the robot means, the tool can be moved closer to the component having the opening and can be applied thereto. The robot means thus makes it possible to automatically connect the two components.

In one advantageous development of the invention, it is provided that the retaining means of the tool is formed by an edge region of a runner of the tool, in which the gripping elements are to be guided along the fastening direction. At least in the edge region, the runner can have a cylindrical design. In the runner, the gripping elements can be moved relative to the runner along the fastening direction in order to pull the at least one ball into the opening of the other component. In order to connect the two components, the tool can be applied to the other component by the edge region of the runner. In this case, the periphery of the opening of the other component is surrounded by the edge region of the runner. Subsequently, when actuating the tool, the ball fastened to the other component is gripped by the gripping elements and pulled into the opening. When pulling the ball into the opening, the gripping elements are pulled into the runner along the fastening direction. By means of the edge region of the runner, the other component can be retained in a particularly simple and uniform manner, in particular in the region of the opening, in order to allow the ball to be pulled into the opening in a uniform, simple and fast manner.

In another embodiment of the invention, it has proven to be advantageous for the tool to include a punching means, by which a wall defining the opening of the other component can be pressed onto the ball. The wall can be a collar. The punching means is configured in particular to press the wall defining the opening onto the ball by reshaping the wall after the ball is pulled into the opening by means of the gripping elements, and to thereby clamp the ball in the opening. On the wall of the opening, in particular at least two clamping elements can be provided which can be reshaped by the punching means in order to clamp the ball by means of the clamping elements. The clamping elements can protrude for example from the other component and define at least some regions of the opening. When clamping the ball in the opening, at least the clamping elements are in contact with the ball and securely hold the ball in the opening. In particular, the clamping elements make it possible for a diameter of the opening over a peripheral region to be greater than a diameter of the ball so that the ball can be gripped by the gripping elements and pulled into the opening. By means of the clamping elements which are to be placed on the ball, the ball is to be fixed in the opening.

In this context, it has proven to be particularly advantageous for the punching means to be movable relative to the retaining means and relative to the gripping elements along the fastening direction. In this case, the punching means is arranged in particular in the runner and can be moved in the runner relative to the retaining means along the fastening direction. In this case, it can be provided that the gripping elements can be moved in the punching means relative thereto along the direction of movement. The ball can thus be pulled into the opening of the other component by means of the gripping elements, and subsequently, the clamping elements of the other component can be pressed onto the ball from the outside by the punching means. By the punching means, the clamping elements can be pressed onto the ball, whereas by the retaining means, the other component can be held in the position thereof relative to the retaining means. In order to press the clamping elements onto the ball in a particularly advantageous manner, it is provided that the punching means can be moved in the opposite direction to the gripping elements along the direction of movement. The ball can thus be pulled in a first direction along the fastening direction by means of the gripping elements, whereas by the punching means, the clamping elements are pushed along the fastening direction in a second direction which is counter to the first direction. The ball can thus be clamped in the opening of the other component in a particularly simple manner.

In this context, it has proven to be particularly advantageous for the punching means to be mechanically coupled to the gripping elements, whereby a movement of the gripping elements along the fastening direction results in an opposite movement of the punching means along the fastening direction. This means that the gripping elements and the punching means are mechanically coupled to one another so as to ensure that the punching means and the gripping elements can be moved simultaneously in different directions to one another along the direction of movement. Accordingly, at the same time, by means of the gripping elements, the ball can be pulled into the opening, and the punching means can be moved towards the second component in order to press the clamping elements of the second component onto the ball. The tool can thus be actuated only once, as a result of which the ball is pulled into the opening, and the clamping elements are also pressed onto the ball. The tool thus makes it possible to fasten the ball in the opening of the other component in a particularly simple and fast manner.

In another embodiment of the invention, it has proven to be advantageous for the gripping elements to be in the form of claws. In particular, the outer contour of the claws is adapted to an outer contour of the ball. The claws can thus be placed on the outer contour of the ball in a planar manner, as a result of which the ball can be gripped in a particularly secure manner by the claws. Designing the gripping elements as claws thus makes it possible to hold the ball on the gripping elements in a particularly secure manner so that the ball can be moved by the gripping elements in a secure manner.

In another embodiment of the invention, it has proven to be advantageous for the tool to include a trigger handle, by means of which the movement of the gripping elements relative to the retaining means along the fastening direction can be controlled. By means of the trigger handle, the tool can be actuated, and the movement of the gripping elements relative to the retaining means along the fastening direction can be triggered. A movement of the trigger handle relative to a main component, in particular a gripping element of the tool, can be translated directly into the movement of the gripping elements relative to the retaining means so that, by means of the actuation of the trigger handle, a speed of movement of the gripping elements relative to the retaining means can be controlled directly. By means of the trigger handle, in particular the movement of the punching means relative to the retaining means can also be controlled. For this purpose, the punching means can be mechanically coupled to the gripping elements and/or mechanically coupled to the trigger handle so that a movement of the trigger handle relative to the main component or the gripping element results in the movement of the punching means relative to the retaining means. By means of the trigger handle, the connection of the two components via the at least one ball can be controlled in a particularly simple and secure manner by means of the tool.

In this context, it has proven to be advantageous for the tool to include a pivoting means, by which the trigger handle can be pivoted relative to the gripping element of the tool about an axis of rotation in order to actuate the tool. This means that, via the pivoting means, the trigger handle can be held on the gripping element so as to be able to pivot relative to the gripping element about the axis of rotation. The trigger handle which can be pivoted relative to the gripping element about the axis of rotation makes it possible for the tool to be actuated in the manner of tongs. The tool can thus be actuated in a particularly simple and intuitive manner.

It has also proven to be advantageous for the tool to have a return means, by which the trigger handle can be returned to a starting position after actuation. In this case, the return means can include a spring means having at least one spring. When actuating the trigger handle and thus pivoting the trigger handle relative to the gripping element about the axis of rotation, a spring tension is built up in the spring means, by which tension the trigger handle can be returned to the starting position after the actuation thereof. The return means ensures that the tool can be actuated multiple times in succession, wherein as a result of the return by the return means, particularly short cycle lengths can be achieved when actuating the tool.

In another embodiment of the invention, it is provided that, in order to grip the ball, the gripping elements can be pivoted relative to one another about a pivot axis. In this case, the pivot axis runs in particular perpendicularly to the fastening direction. In order to grip the ball, the gripping elements are pivoted towards one another about the pivot axis, the gripping elements gripping the ball on different sides of the ball. In order to grip the ball, the gripping elements are placed on the ball from the outside by pivoting about the pivot axis. The ball can thus be gripped in a particularly simple manner.

The invention further relates to a method for connecting two components by means of at least one ball which is fastened to a first component and can be fastened in an opening of the second component. In the method, it is provided that one of the components is received by means of a gripping device and oriented relative to the other component. In the method, it is further provided that, by a robot means, a tool is placed on the component having the opening. The robot means and the tool are in particular part of an apparatus, as has already been described in connection with the apparatus according to the invention. In the method, it is further provided that, by means of the at least two gripping elements of the tool, the ball is encompassed and pulled into the opening in a fastening direction. Meanwhile, by a retaining means of the tool, the component having the opening is held in the position thereof relative to the tool along the fastening direction. In order to pull the ball into the opening, the gripping elements are moved relative to the retaining means along the fastening direction until the two components are in contact with one another. The robot means allows the tool to be automatically placed on the component having the opening, and the two components to be connected by means of the tool. In particular, the robot means makes it possible to orient the tool relative to a surface of the component having the opening so as to be able to place the tool on the surface of the component having the opening in a particularly advantageous manner. As a result, a particularly low error rate can be achieved for the automated connection of the components, and in particular, it is possible to ensure that the tool can be placed on the component having the opening in a particularly fast manner. The gripping device can also be moved in an automated manner, as a result of which the gripping device allows an automatic orientation of the components relative to one another. By means of the gripping device and the robot means moving the tool, the component having the opening and the tool can be oriented relative to one another in an automated manner and placed on one another in a particularly simple and particularly fast manner.

In another embodiment of the invention, it has been shown to be advantageous when, by means of the gripping device, the component having the opening is received, and the tool is placed on a side of the component having the opening which faces the gripping device. This means that both the gripping device and the tool are arranged on the same side of the component having the opening. In particular, by means of the gripping device, a first side of the component having the opening can be placed on the component having the ball. In order to allow a planar arrangement of the component having the opening on the component having the ball, the gripping device is arranged on a second side of the component having the opening which is opposite the first side. As a result of the fact that the first side of the component having the opening is in contact with the component having the ball, the tool is to be placed on the second side of the component having the opening in order to interconnect the components by means of the tool pulling the ball through the opening. In this case, the tool can be operated in particular in an automated manner. The gripping device thus makes it possible to place the tool on the second side of the component having the opening, on which the gripping device is arranged relative to the component having the opening.

In this context, it has proven to be particularly advantageous for the gripping device to have at least two gripping arms, in particular at least three gripping arms, which define an action region in which the component having the opening can be gripped by means of the gripping arms. In this case, it is further provided that the tool is placed in the action region on the side of the component having the opening which faces the gripping device. The action region is thus defined by means of respective possible application points of the gripping arms on the second side of the component having the opening. The action region is defined by all the possible application points of the gripping arms on the second side of the component having the opening in the case of a predefined relative position of a reference point of the gripping device relative to the second side of the component having the opening. In particular, within this action region, the tool can be placed on the second side of the component having the opening by the robot means. In particular in the case of an application of force by the component having the opening on the second side thereof in the action region, the component having the opening is held in a particularly secure manner by means of the gripping device. A risk of the tool slipping relative to the component having the opening or a risk of the component having the opening coming loose from the gripping device is particularly low when applying the tool in the action region.

In another embodiment of the invention, it has been shown to be particularly advantageous for an application point for the tool to be predefined on the component having the opening and, by means of the gripping device, for the application point to be released for an application of the tool when receiving the component having the opening. In this case, the application point is arranged in particular on the second side of the component having the opening. More preferably, the application point is arranged in the action region of the second side of the component having the opening. This means that, in the method, the application point to which the tool is to be applied on the second side of the component having the opening is determined. According to the determined application point, the gripping arms of the gripping device are arranged in the action region, the gripping arms releasing the application point for the tool, whereby, after receiving the component having the opening, the tool is applied to the application point by means of the gripping device. A respective orientation or arrangement of the gripping arms within the action region is thus adapted to a determined application point for the tool which is to be kept clear, in order to allow the application of the tool by the robot means after receiving the component having the opening by means of the gripping device. In this way, it can be ensured that, after receiving the component having the opening, the tool can be applied to the application point by the robot means, at which application point the components are to be interconnected via the ball.

In another embodiment of the invention, it has been shown to be advantageous for the component having the ball to be received by a first gripping device, for the component having the opening to be received by a second gripping device, for the components to be oriented relative to one another and to be arranged in contact with one another by means of the gripping devices, and for the components to be interconnected by means of the tool by pulling the ball into the opening. This means that each of the components to be interconnected is received by a separate gripping device, and the components are oriented three-dimensionally in the space and placed in contact with one another by means of the gripping devices. By means of the three-dimensional orientation of the components placed in contact with one another in the space by means of the gripping devices, it can be ensured that the tool has particularly good access to the component having the opening. In particular, the components can be arranged relative to one another in the three-dimensional space by means of the gripping devices in such a way that, by the robot means, the tool can be applied to the component having the opening in a particularly simple and fast manner, in particular in the action region of the second gripping device, by means of which the component having the opening is received, and/or to the application point for the tool. As a result, particularly short cycle lengths can be achieved during the automated connection of the components by the pivoting means.

Further features of the invention can be found in the claims, the drawings, and the description of the drawings. The features and combinations of features cited above in the description and the features and combinations of features cited below in the description of the drawings and/or shown in isolation in the drawings can be used not only in the combination indicated in each case, but also in other combinations or in isolation.

The invention will now be described in greater detail on the basis of a preferred exemplary embodiment and with reference to the drawings.

DETAILED DESCRIPTION OF THE DRAWINGS

Figure 1:
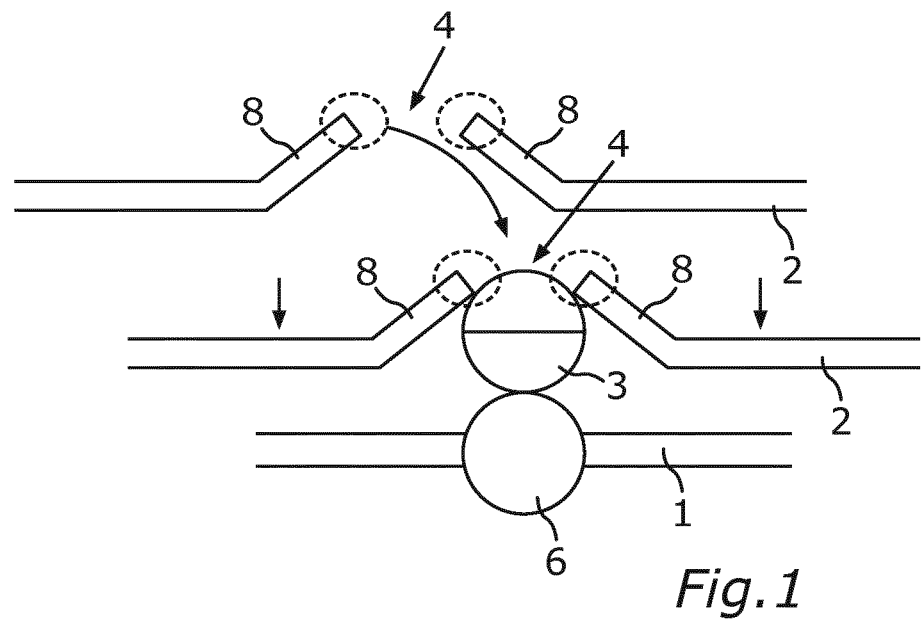
FIG. 1 is a schematic sectional view of two components, wherein two stacked balls are fastened to the first component, and the second component has an opening into which the one of the two balls that protrudes further from the first component is to be pulled.

In the drawings, functionally like parts are provided with like reference signs.

Figure 9:
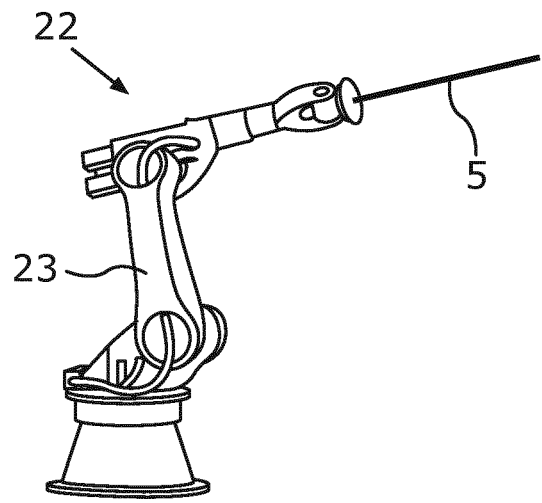
FIG. 9 is a schematic perspective view of an apparatus for connecting the components using a robot means, by which the tool can be received and applied to the second component.

In the following, it is described how two components, a first component 1 and a second component 2, can be fastened to one another via at least one ball 3. In the present case, the components 1, 2 are motor vehicle components. In order to interconnect the components 1, 2, the ball 3 fastened to the first component 1 is moved into an opening 4 of the second component 2 and held therein. In order to ensure that the ball 3 is pulled into the opening 4 in a particularly fast manner, and moreover to ensure that the ball 3 is held in the opening 4 of the second component 2 in a particularly secure manner, a manually actuatable tool 5 shown in FIG. 6 and an apparatus 22 shown in FIG. 9 are provided with the tool 5, by means of which the components are to be interconnected. In FIGS. 1 to 5, respective method steps of the connection of the first component 1 to the second component 2 are shown.

The ball 3 is fastened to the first component 1 via an additional ball 6. In the present case, the ball 3 and the additional ball 6 are in the form of a double ball. For this purpose, the ball 3 and the additional ball 6 are integrally bonded to one another. Moreover, the additional ball 6 can be integrally bonded to the first component 1 so that the ball 3 is held on the first component 1 via the ball 6. In particular, the ball 3 protrudes at least substantially perpendicularly from the first component 1. In the present case, the ball 3 is free from direct contact with the first component 1. In an alternative embodiment of the first component 1 shown in FIG. 8, the ball 3 is held on the first component 1 via a fastening element 7. In this case, the fastening element 7 is integrally bonded to the ball 3 and integrally bonded to the first component 1 in order to hold the ball 3 on the first component 1.

The opening 4 of the second component 2 is delimited by a wall of the second component 2. In this case, the second component 2 has two clamping elements 8 which provide at least some regions of the wall. In the present case, the clamping elements 8 project from the second component 2. In the present case, the opening 4 has an H-shaped cross section.

In order to connect the first component 1 to the second component 2, as shown in FIG. 1, the second component 2 is to be placed onto the ball 3 on a half of the ball 3 which faces away from the first component 1. In particular, the second component 2 is placed on the ball 3 in such a way that the ball 3 is positioned on or in the opening 4 of the second component 2.

In the present case, the clamping elements 8 of the component 2 have an H-shaped collar geometry.

Figure 2:
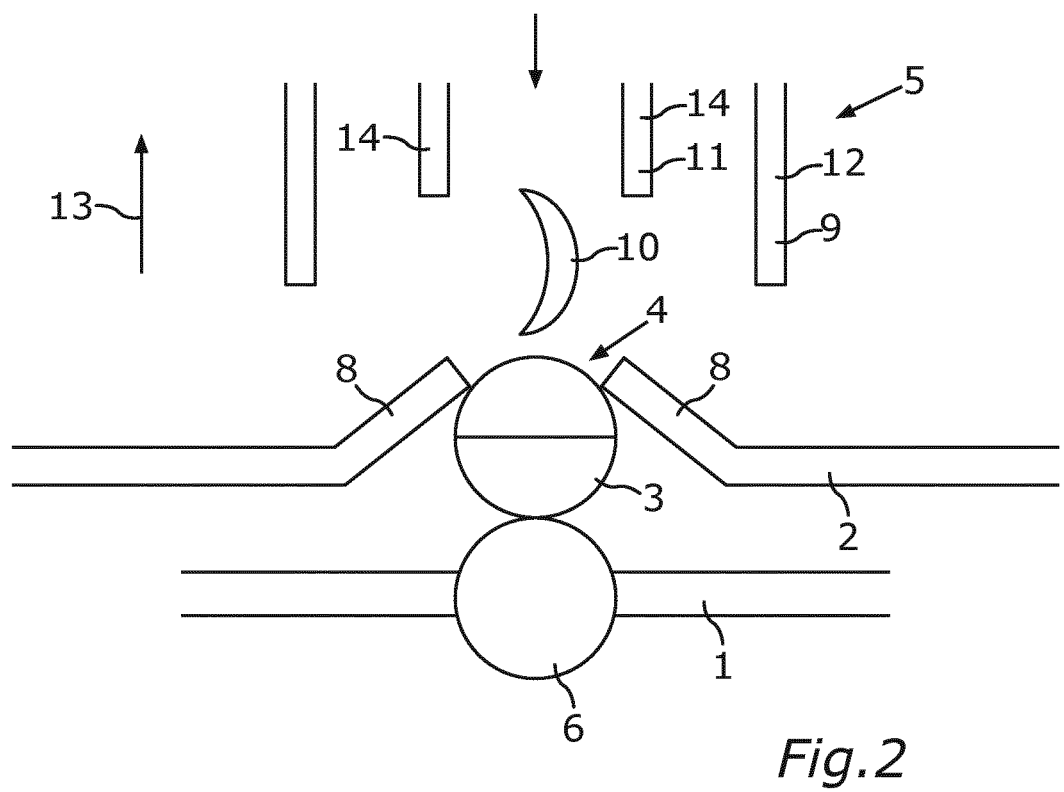
FIG. 2 is a schematic sectional view of the second component having an opening which is placed on the ball of the first component, wherein a tool is moved towards the components in order to connect the two components.

The H-shaped collar geometry of the second component 2 is thus placed above an equator of the ball 3 and thus onto the half of the ball 3 which faces away from the first component 1. Subsequently, as shown in FIG. 2, the tool 5 is moved towards the still loose point of connection of the first component 1 to the second component 2. In particular, the tool 5 is brought closer to the connection point on sides of the H-shaped collar geometry and thus on sides of the second component 2.

As can be seen in FIG. 2, the tool 5 includes a retaining means 9, at least one gripping element 10, in the present case precisely two gripping elements 10, and a punching means 11. The retaining means 9 is formed by an edge region of a runner 12 of the tool 5. The runner 12 is formed so as to be hollow inside. The gripping elements 10 and the punching means 11 are arranged inside the runner 12. Both the gripping elements 10 and the punching means 11 can be moved relative to the runner 12 along a fastening direction 13. In the present case, the fastening direction 13 coincides with a direction of longitudinal extent of the runner 12 of the tool 5. In the present case, the punching means 11 is arranged inside the runner 12 so as to be offset by 90° relative to the gripping elements 10 in the fastening direction 13. The gripping elements 10 are in the form of respective claws, and the geometry thereof is adapted to an outer contour of the ball 3, and therefore the geometry of the gripping elements 10 forms a negative of the outer contour of the ball 3 at least in some regions. With the geometry thereof which is adapted to the outer contour of the ball 3, the gripping elements 10 can be placed on the ball 3 in order to grip the ball 3. In order to grip the ball 3, the gripping elements 10 can be pivoted relative to one another about a pivot axis. In the present case, the pivot axis runs perpendicularly to the fastening direction 13. In order to grip the ball 3, the gripping elements 10 are pivoted out of an open position in which the elements are pivoted back from one another, into a gripping position in which the elements are pivoted towards one another and in which the geometry of the gripping elements 10 can be placed on the outer contour of the ball 3. In the gripping position of the gripping elements 10, the ball 3 can be gripped by means of the gripping elements 10.

In the present case, the punching means 11 includes two punching elements 14 which are each arranged so as to be offset from the gripping elements 10 by 90° in the fastening direction 13. The punching elements 14 can be moved in the opposite direction to the gripping elements 10 along the fastening direction 13.

Figure 3:
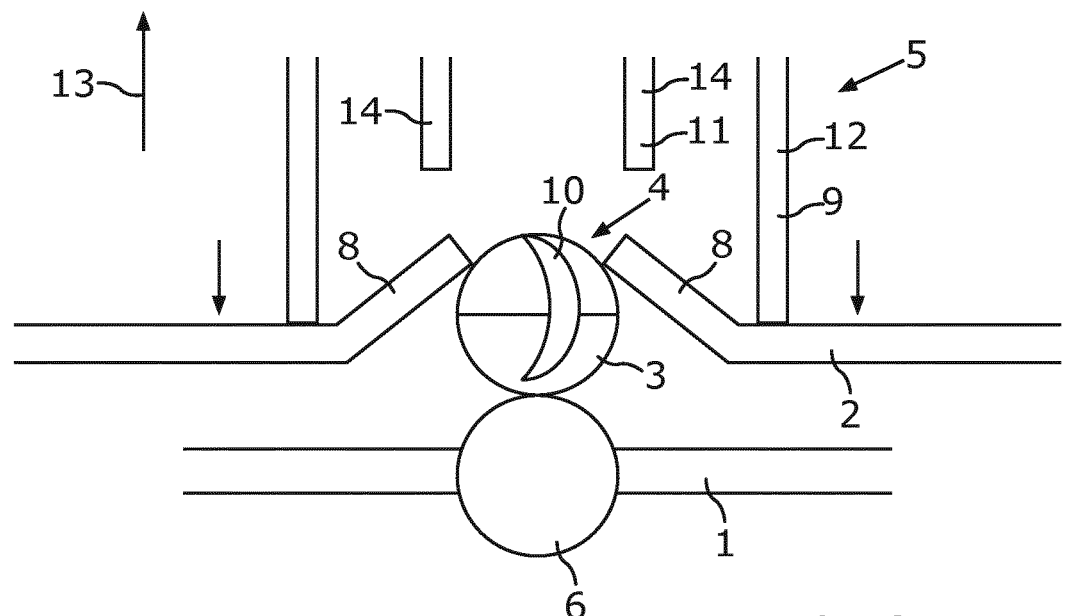
FIG. 3 is a schematic sectional view of the two components, wherein the tool is arranged on the second component with an edge region of a runner of the tool as a retaining means, and gripping elements of the tool encompass the ball that protrudes further from the first component.
Figure 4:
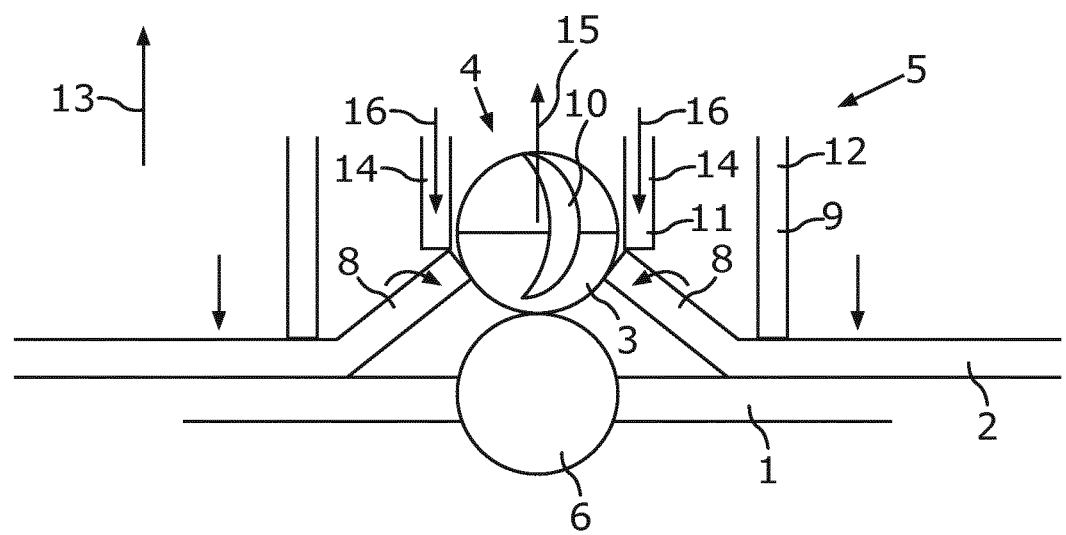
FIG. 4 is a schematic sectional view of the two components comprising the tool having a retaining means which is in contact with the second component, wherein by means of the gripping elements, the ball is pulled into the opening of the second component, and by a punching means, clamping elements of the second component that laterally define at least some regions of the opening are pressed onto the ball in order to fix the ball in the opening.

As shown in FIG. 3, in order to fasten the first component 1 to the second component 2, the runner 12 of the tool 5 is placed on the second component 2. Furthermore, the ball 3 is gripped by means of the gripping elements 10. In particular, the retaining means 9 of the tool 5 can be placed on the component 2 so as to be able to pull the ball 3 along the fastening direction 13 into the runner 12 of the tool 5 by means of the gripping elements 10. In the next step, which is shown in FIG. 4, the ball 3 is pulled further along the fastening direction 13 into the runner 12 by means of the gripping elements 10, as a result of which the ball 3 is pulled into the opening 4 of the second component 2. When pulling the ball 3 into the runner 12, the second component 2 is retained by the retaining means 9. As a result, the ball 3 is pulled into the opening 4 of the second component 2. Consequently, when pulling the ball 3 along the fastening direction 13 into the opening 4 by means of the gripping elements 10, the second component 2 is held in the position thereof relative to the runner 12 along the fastening direction 13 by the retaining means 9. By means of the gripping elements 10, the ball 3 is to be pulled along the fastening direction 13 into the runner 12 until the first component 1 is in contact with the second component 2. When actuating the tool 5, the gripping elements 10 pull the ball 3 into the undercut of the H-shaped collar geometry of the second component 2 after the retaining means 9 stops against the second component 2. By means of the gripping elements 10, the ball 3 is moved relative to the runner 12 along the fastening direction 13 in a first direction 15. When pulling the ball 3 by means of the gripping elements 10, the punching elements 14 of the punching means 11 are moved relative to the runner 12 along the fastening direction 13 in a second direction 16 running counter to the first direction 15. By means of the punching elements 14 moved in the second direction 16 along the fastening direction 13, the clamping elements 8 of the second component 2 are pressed onto the ball 3. The clamping elements 8 can also be referred to as wing claws which are compressed into, in particular compressed onto the ball 3 by the punching means 11 in order to provide particularly strong clamping of the ball 3 in the opening 4. In the present case, the punching means 11 is mechanically coupled to the gripping elements 10 so that a movement of the gripping elements 10 along the fastening direction 13 in the first direction 15 results in a movement of the punching means 14 along the fastening direction 13 in the second direction 16.

Figure 5:
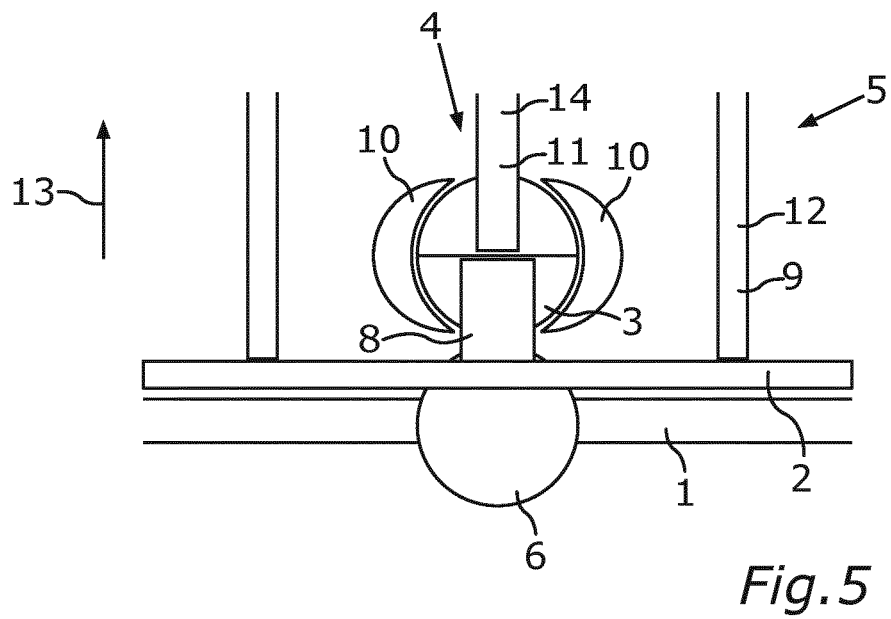
FIG. 5 is a sectional view of the two components which is rotated by 90° relative to FIGS. 1 to 4, wherein the tool is applied to the second component, the ball is pulled into the opening by means of the gripping elements, and the collar elements of the second component are pressed onto the ball by the punching means.

In FIG. 5, the method step shown in FIG. 4 is shown once again, in which the section through the components is shown offset by 90°. In this case, the 90° offset of the punching elements 14 to the gripping elements 10 along the fastening direction 13 can be seen particularly well.

Figure 6:
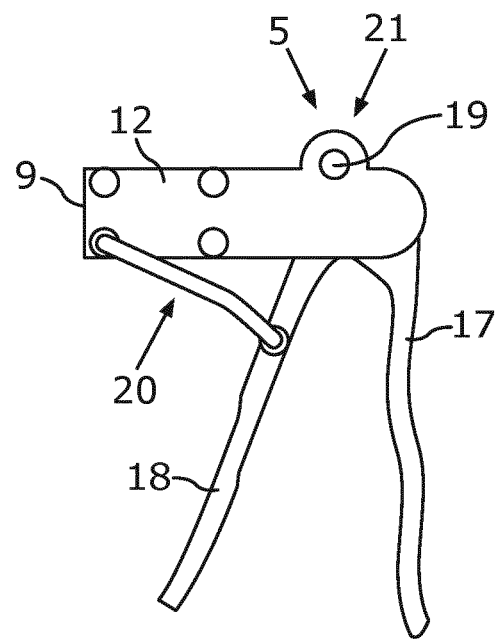
FIG. 6 is a side view of the tool comprising a trigger handle which can be pivoted relative to a gripping element of the tool about an axis of rotation, by means of which handle a movement of the gripping elements relative to the retaining means can be triggered, and comprising a return means by which the trigger handle can be returned to a starting position after the actuation thereof.

FIG. 6 shows a manually operable variant of the tool 5. In this case, it can be seen that the tool 5 includes a gripping element 17 on which the tool 5 can be held by a user in a particularly convenient manner. The tool 5 further comprises a trigger handle 18 which can be rotated relative to the gripping element 17 about an axis of rotation 19. In order to actuate the tool 5 and thus trigger respective movements of the gripping elements 10 and/or the punching elements 14 along the fastening direction 13, the trigger handle 18 is to be pivoted relative to the gripping element 17 about the axis of rotation 19. Pivoting the trigger handle 18 relative to the gripping element 17 is made possible by a pivoting means 21, by which the trigger handle 18 is held on the runner 12 and/or the gripping element 17 so as to be able to pivot about the axis of rotation 19. In order to ensure that the trigger handle 18 can be returned to a starting position in a particularly simple manner after the actuation thereof, a return means 20 is provided, by which the trigger handle 18 can be returned to the starting position. In the present case, the return means 20 includes a spring means, by which the trigger handle 18 is connected to the runner 12.

Figure 7:
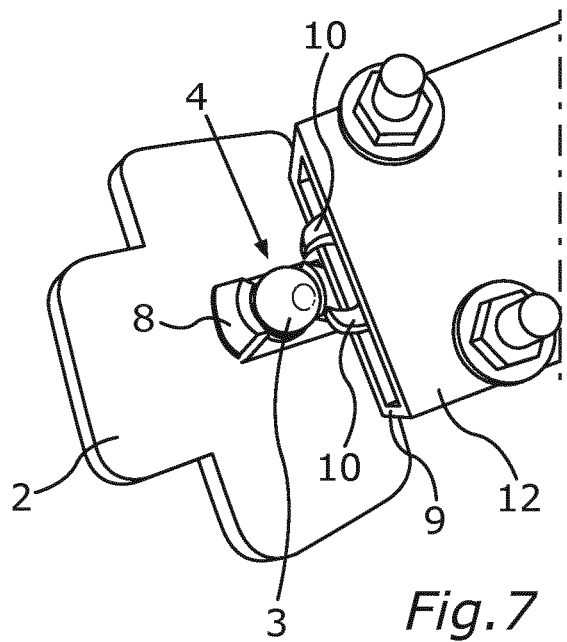
FIG. 7 is a perspective view of the second component, wherein the ball is fastened in the opening, and the tool is removed from the second component.

FIG. 7 shows the second component 2 connected to the first component 1, wherein the runner 12 of the tool 5 is lifted off the second component 2 after the connection has been produced. In FIG. 5, it can be seen that, in the present case, the runner 12 has a rectangular cross section. Moreover, the gripping elements 10 can be seen, by means of which the ball 3 is to be gripped and pulled into the opening 4 of the component 2.

Moreover, in FIG. 7, it can be seen that the opening 4 of the second component 2 has an H-shaped contour.

Figure 8:
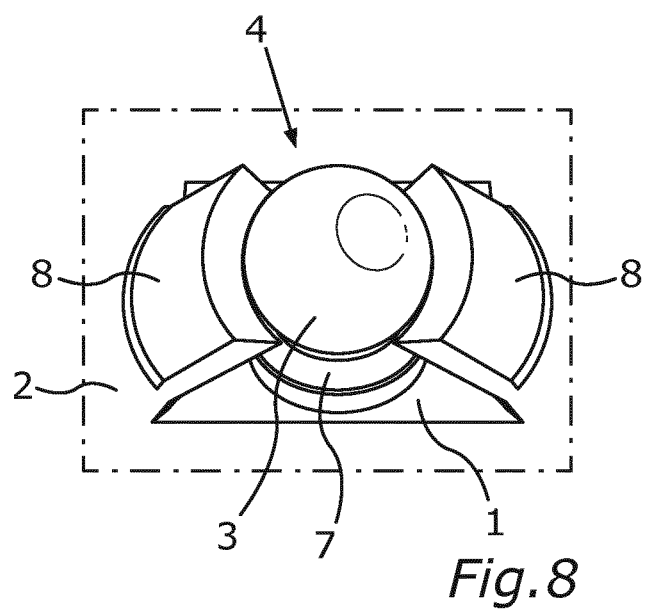
FIG. 8 is a perspective view of the ball fastened in the opening of the second component.

FIG. 8 is an oblique plan view of the second component 2 which shows the ball 3 clamped in the opening 4 by means of the clamping elements 8. The respective free ends of the clamping elements 8 are pressed onto the ball 3. The ball 3 is thus held in the opening 4 of the second component 2 in a particularly secure manner so that, via the ball 3, in turn a particularly secure connection is provided between the first component 1 and the second component 2.

In the present case, the gripping element 17 has an ergonomic design. Alternatively or additionally, a 3D-printed exchangeable handle shell can be provided, which can be placed around the gripping element 17 in order to allow a user to handle the tool 5 in a particularly secure manner.

To receive the ball 3 by means of the gripping elements 10, the undercuts of the gripping elements 10 can encompass the ball 3 on the half thereof facing the first component 1. In particular, the ball 3 is grasped by means of the gripping elements 10 while offset by 90° to the positioned H-shaped collar of the second component 2, which defines the opening 4. By means of the gripping elements 10, the ball 3 can be received in a planar manner or at selective points. A tractive force of the gripping elements 10 can be adjusted to up to 1000 N. The runner 12 can have in particular a diameter of at most 20 mm, in particular at most 15 mm, and a length of at most 400 mm, in particular at most 300 mm. The runner 12 can be designed to be continuous as far as the gripping element 17. The runner 12 can be configured to provide an adjustable travel limit for the gripping elements 10. An application of force and/or a movement of the punching means 11 along the fastening direction 13 can be adjusted according to a sheet thickness of the first component 1 and/or of the second component 2.

By means of the tool 5, the first component 1 and the second component 2 can be produced safely, robustly and in a particularly simple manner via a combination of a double ball and an H-shaped collar. A basic principle of the tool 5 corresponds to a system of a pulling-off means with the additional function that the clamping elements 8 are compressed in order to fix the first component 1 to the second component 2 in a solid, stable manner.

In order to connect the first component 1 to the second component 2, the H-shaped collar geometry of the second component 2 is placed above the equator onto the half of the ball 3 facing away from the first component 1, and the runner 12 of the tool 5 is pulled over the opening 4 so that this runner is positioned on the H-shaped collar side. When actuating the trigger handle 18, the gripping elements 10 pull the ball 3 into an undercut in the H-shaped collar geometry after the second component 2 stops against a runner opening of the runner 12, as a result of which the point of connection between the first component 1 and the second component 2 is fixed. In order to additionally allow particularly strong clamping of the ball 3 in the opening 4 of the second component 2, the clamping elements 8, which can also be referred to as wing claws, are compressed by the punching means 11. As a result, the ball 3 is clawed into the opening 4, thereby forming a ball claw.

The tool 5 can be manually actuated by a user as described above or actuated in an automated manner by means of a control unit. Moreover, the tool 5 can be moved onto the second component 2 having the opening 4 and applied by the user or can be moved onto the second component 2 having the opening 4 and applied in an automated manner.

Figure 10:
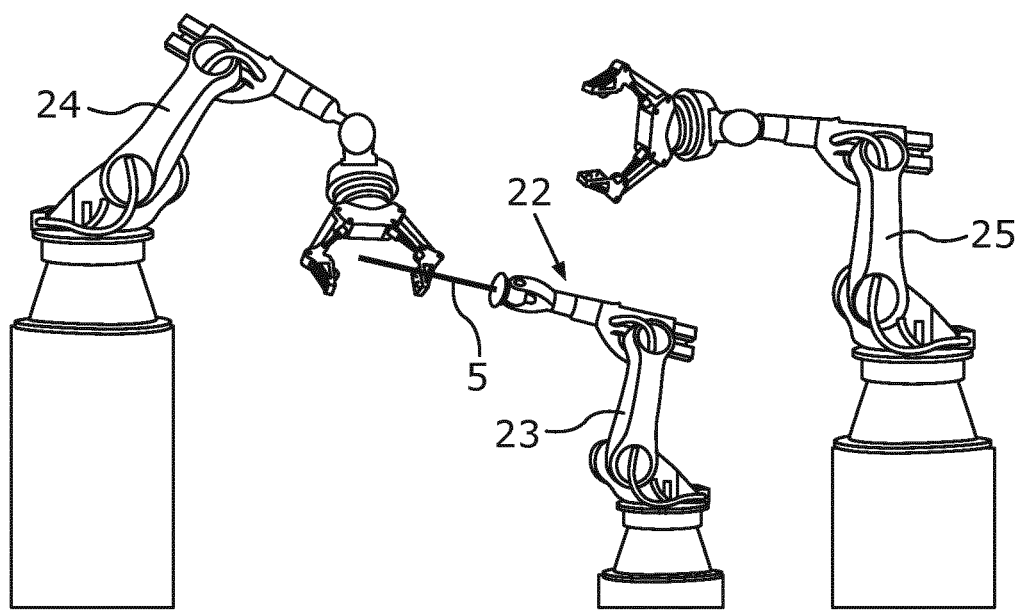
FIG. 10 is a schematic perspective view of a system for connecting the two components comprising two gripping devices, by means of which in each case one of the components can be received, and by means of which the components can be orientated relative to one another and can be placed in contact with one another, and comprising the apparatus having a tool that can be applied to the second component in order to pull the ball of the first component through the opening of the second component.

FIG. 9 shows an apparatus 22 which includes a robot means 23 and the tool 5. By the robot means 23, the tool 5 can be received and autonomously moved closer to the second component 2 and can be applied thereto. FIG. 10 shows a system for connecting the first component 1 to the second component 2, which system includes a first gripping device 24, a second gripping device 25 and the apparatus 22. By means of the first gripping device 24, the first component 1 having the ball 3 can be received. By means of the second gripping device 25, the second component 2 having the opening 4 can be received. The first gripping device 24 and the second gripping device 25 can each be operated in an automated manner. The gripping devices 24, 25 thus allow the components 1, 2 to be received and oriented relative to one another in an automated manner. The components 1, 2 oriented relative to one another, which are received by means of the gripping devices 24, 25, can be interconnected by means of the apparatus 22 by the tool 5 of the apparatus 22 pulling the ball 3 of the first component through the opening 4 of the second component. In a method for connecting the first component 1 to the second component 2, the first component 1 is thus received by means of the first gripping device 24, and the second component 2 is received by means of the second gripping device 25. Subsequently, by means of the gripping device 24, 25, the components 1, 2 are oriented three-dimensionally in the space relative to one another and brought into contact with one another. In this case, a wall of the second component 2 defining the opening 4 is placed on the ball 3 of the first component 1. Subsequently, by the robot means 23, the tool 5 is placed on a second side 26 of the second component 2 facing away from the first component 1. In this case, the tool 5 is placed on an application point 30 of the second component 2. By means of the tool 5, the ball 3 of the first component 1 is pulled through the opening 4 of the second component 2, as a result of which the components 1, 2 are interconnected.

When the second component 2 is received by means of the second gripping device 25, the second gripping device 25 is arranged on the second side 26 of the first component 2. The second component 2 is brought into contact with a first side which is opposite the second side 26 when connecting the components 1, 2 to the first component 1. Accordingly, by means of the second gripping device 25, the first side of the second component 2 is oriented relative to the first component 1, the second gripping device 25, in particular a predominant part of the gripping device 25, is arranged relative to the second component 2 facing the second side 26 of the second component 2. The tool 5 of the apparatus 22 is placed on the second side 26 of the second component 2 in order to pull the ball 3 of the first component 1 through the opening 4 of the second component 2. The tool 5 and the second gripping device 25 are thus arranged on the same second side 26 of the second component 2 when interconnecting the components 1, 2.

Figure 11A:
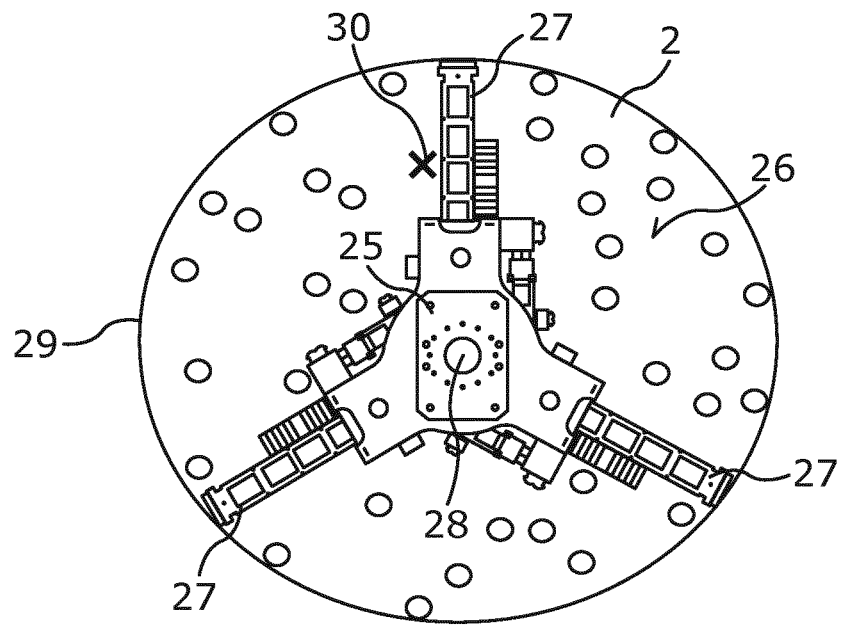
FIGS. 11a to 11b show respective plan views of the second component gripped by means of one of the gripping devices on a side facing the gripping device gripping the second component, respective gripping arms of the gripping device defining an action region within which the gripping arms can be applied to this side of the second component, and within which the gripping arms can release an application point for the tool on this side of the second component.
Figure 11B:
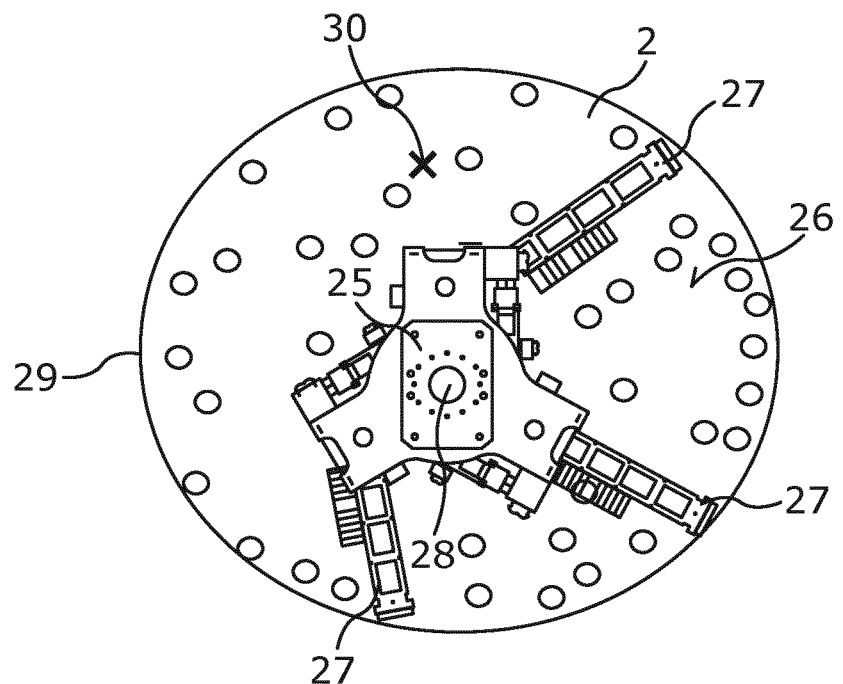

In FIGS. 11a and 11b, the second side 26 of the second component 2 is shown in a plan view. In this case, it can be seen that the second gripping device 25 is arranged on the second component 2 facing the second side 26 of the second component 2, in a state in which the second component 2 is received by the second gripping device 25.

In the present case, the second gripping device 25 has three gripping arms 27, by means of which the second component 2 can be received. The gripping arms 27 are to be placed on the second side 26 of the second component 2 in order to receive the second component 2. The gripping arms 27 can be moved relative to a base element 28 of the second gripping device 25. All of the possible application points of the gripping arms 27, via which the component 2 can be received by means of the gripping arms 27, define, for each orientation of the base element 28 relative to the second component 2, an action region 29 for this predefined position of the base element 28 relative to the second component 2, in particular the second side 26 of the second component 2. The action region 29 thus defines all of the application points at which the component 2 can be received by means of the second gripping device 25 in a defined orientation of the base element 28 of the second gripping device 25 relative to the second component 2. In particular in the case of an application of force by the second component 2 on the second side 26 thereof in the action region 29, the component 2 can be held in a particularly secure manner by means of the second gripping device 25. Thus, in the present case, the tool 5 of the apparatus 22 is placed in the action region 29 on the second side 26 of the second component 2 in order to connect the second component 2 to the first component 1 in the action region 29. In order to prevent a collision of the second gripping device 25 with the tool 5 of the apparatus 22, an application point 30 is determined, at which the tool 5 is to be placed by the robot means 23 on the second side 26 of the second component 2 in order to interconnect the components 1, 2. By means of the second gripping device 25, the gripping arms 27 are oriented in the action region 29 according to the determined application point 30, as a result of which, by means of the second gripping device 25, the application point 30 is released in order to allow the tool 5 to be placed on the application point 30 on the second side 26 of the second component 2. The tool 5 can thus be placed on the application point 30 between the gripping arms 27 of the second gripping device 25 on the second side 26 of the second component 2, as a result of which the components 1, 2 can be interconnected by means of the tool 5 at the application point 30 by pulling the ball 3 through the opening 4. Moving the gripping arms 27 relative to the second side 26 of the second component 2 makes it possible to flexibly arrange the application point 30 within the action region 29 on the second side 26 of the second component 2. The first gripping device 24 can have an identical design to the second gripping device 25.

Overall, the invention shows how octopus tongs can be provided to produce a double-ball H-shaped collar connection, and a flexible and automated connection of the components 1, 2 can take place by means of the apparatus 22 and at least one gripping device 24, 25.

LIST OF REFERENCE CHARACTERS 1 first component
2 second component
3 ball
4 opening
5 tool
6 additional ball
7 fastening element
8 clamping element
9 retaining means
10 gripping element
11 punching means
12 runner
13 fastening direction
14 punching element
15 first direction
16 second direction
17 gripping element
18 trigger handle
19 axis of rotation
20 return means
21 pivoting means
22 apparatus
23 robot means
24 first gripping device
25 second gripping device
26 second side
27 gripping arm
28 base element
29 action region
30 application point

The invention claimed is:

1. An apparatus for connecting a first component to a second component by a ball which is fastened to the first component and which is fastenable in an opening of the second component, comprising:
   a tool which includes two gripping elements and a retaining means;
   wherein the ball can be encompassed and pulled into the opening in a fastening direction by the two gripping elements;
   wherein the second component is holdable in a position relative to the tool along the fastening direction by the retaining means;
   wherein the two gripping elements are movable relative to the retaining means along the fastening direction to pull the ball into the opening until the first and second components are in contact with one another; and
   a robot means, wherein the tool is movable in three dimensions by the robot means.

2. The apparatus according to claim 1, wherein the retaining means is an edge region of a runner and wherein the two gripping elements are guidable in the runner along the fastening direction.

3. The apparatus according to claim 1, wherein the tool includes a punching means and wherein a wall which defines the opening of the second component is pressable onto the ball by the punching means.

4. The apparatus according to claim 3, wherein the punching means is movable relative to the retaining means and relative to the two gripping elements along the fastening direction.

5. The apparatus according to claim 4, wherein the punching means is mechanically coupled to the two gripping elements such that a movement of the two gripping elements along the fastening direction results in a movement of the punching means opposite the fastening direction.

6. The apparatus according to claim 1, wherein the two gripping elements are respective claws.

7. The apparatus according to claim 1, wherein the tool includes a trigger handle and wherein a movement of the two gripping elements relative to the retaining means along the fastening direction is controllable by the trigger handle.

8. The apparatus according to claim 7, wherein the trigger handle is pivotable relative to a further gripping element of the tool about an axis of rotation.

9. The apparatus according to claim 7, wherein the tool includes a return means and wherein the trigger handle is returnable to a starting position by the return means after an actuation.

10. The apparatus according to claim 1, wherein the two gripping elements are pivotable relative to one another about a pivot axis.

11. A method for connecting a first component to a second component by a ball which is fastened to the first component, wherein the second component has an opening, comprising the steps of:
    receiving the second component by a first gripping device and orienting the second component relative to the first component by the first gripping device;
    applying a tool to the second component by a robot means;
    holding the second component in a position relative to the tool along a fastening direction by a retaining means of the tool;
    encompassing the ball of the first component by two gripping elements of the tool; and
    pulling the ball by the two gripping elements in the fastening direction and into the opening of the second component until the first and second components are in contact with one another by moving the two gripping elements relative to the retaining means along the fastening direction.

12. The method according to claim 11, wherein the tool is applied to a side of the second component which faces the first gripping device.

13. The method according to claim 12, wherein the first gripping device has two gripping arms which define an action region in which, by the two gripping arms, the second component is gripped and wherein the tool, in the action region, is applied to the side of the second component which faces the first gripping device.

14. The method according to claim 11, further comprising the step of predefining an application point for the tool on the second component, wherein by the first gripping device, the application point, when receiving the second component, is released for applying the tool.

15. The method according to claim 11, wherein the first component is received by a second gripping device, wherein the first and second components are oriented relative to one another and are arranged in contact with one another by the first and second gripping devices, and wherein the first and second components are interconnected by the tool by pulling the ball into the opening.

* * * * *